United States Patent [19]

Podgorski

[11] 4,421,386
[45] Dec. 20, 1983

[54] STRESS-FREE WINDOW FOR LASER APPLICATIONS

[75] Inventor: Theodore J. Podgorski, St. Paul, Minn.

[73] Assignee: Honeywell Inc., Minneapolis, Minn.

[21] Appl. No.: 354,415

[22] Filed: Mar. 3, 1982

[51] Int. Cl.³ .............................................. G02B 5/00
[52] U.S. Cl. ...................................... 350/319; 350/310
[58] Field of Search ............ 350/253, 310, 319, 394.5; 372/103; 333/252

[56] References Cited

U.S. PATENT DOCUMENTS 3,420,603  1/1969  Whilems .............................. 372/103
3,555,450  1/1971  Rockwell, Jr. ...................... 350/310

Primary Examiner—William H. Punter
Attorney, Agent, or Firm—Omund R. Dahle

[57] ABSTRACT

A stress-free optic element or window for use in equipment such as lasers. In this window a plurality of circular or curved grooves are formed in the window surface to prevent stresses from reaching the central region of the window used for light beam transmission. The plurality of grooves effectively form a resilient or spring like zone between the periphery of the window and the central region so that stresses generated in the peripheral mounting area are isolated from reaching the central stress-free area.

2 Claims, 5 Drawing Figures

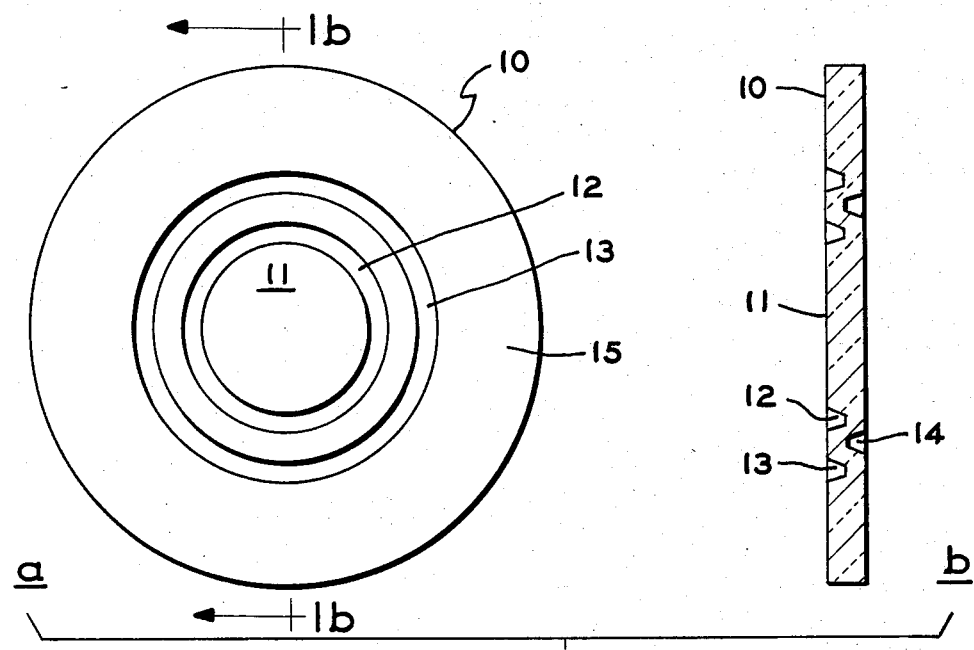
FIG. 1
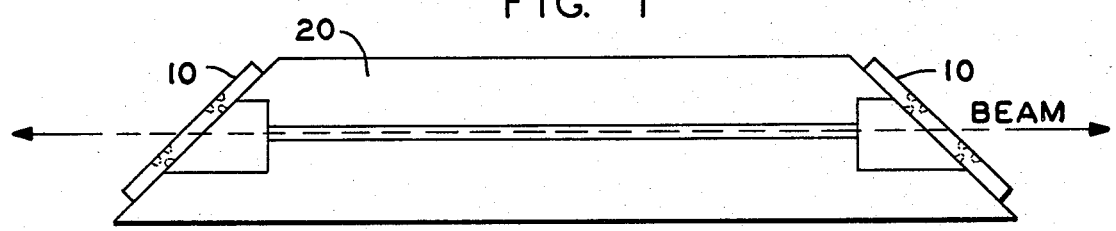
FIG. 2    WINDOWS ON LASER TUBE
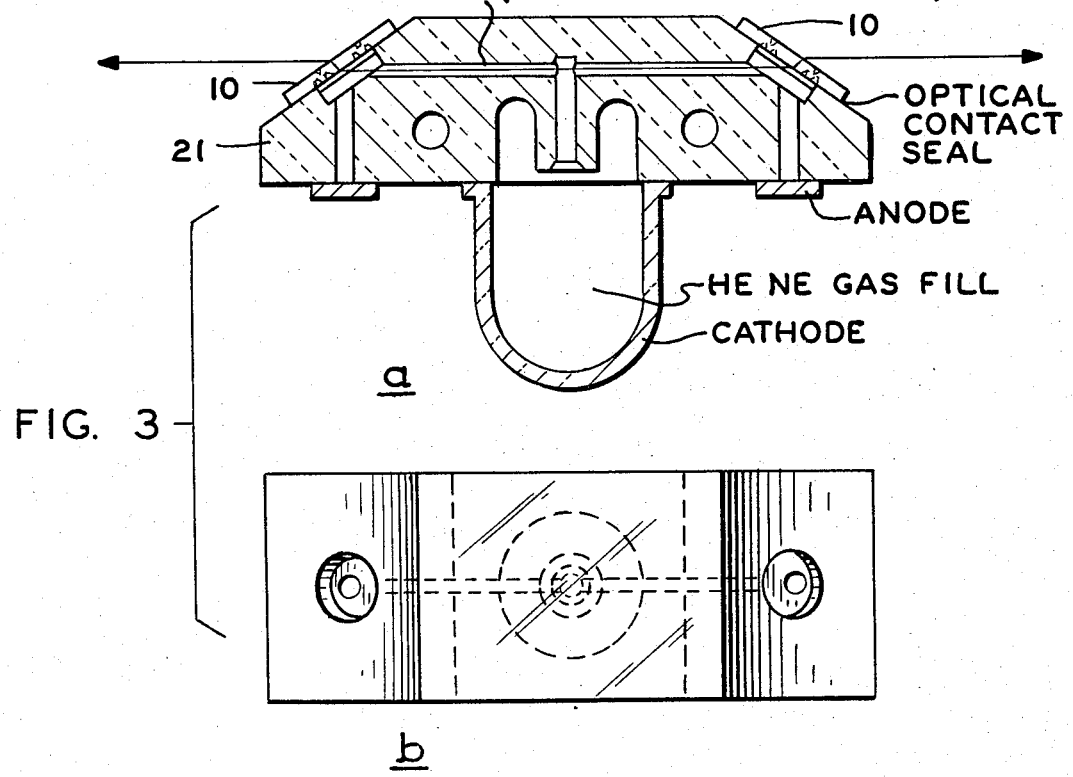
FIG. 3

STRESS-FREE WINDOW FOR LASER APPLICATIONS

BACKGROUND AND SUMMARY OF THE INVENTION

The present invention is related to low loss optic elements such as windows or lenses for use in equipment such as lasers. In the prior art it has been known to use Brewster windows in laser application. The Brewster window is a glass window used at opposite ends of some gas lasers to transmit one polarization of the laser output beam without loss. Previous Brewster window designs have been continuous sheets of glass. Small mismatches in expansion coefficients of the window and of the laser body to which the window is fastened result in stresses in the glass as the temperature changes. Such stresses make the glass window birefringent which increases surface reflectance losses and reduces power output from the laser. Birefringence also provides a retardance mechanism which creates elliptically polarized light from plane polarized light. When the laser is used in laser gyro applications, such elliptically polarized light results in a bias sensitivity to magnetic fields and performance degradation.

In the present invention the Brewster window has a novel structure in that a plurality of circular or curved grooves are formed in the window to isolate stresses from reaching the important window central region used for light beam transmission. The plurality of grooves effectively form a resilient or spring-like zone between the area used to attach the window and the central area used for light beam transmission. Differential (e.g. thermal) motion generated in the peripheral mounting area is stress-decoupled or absorbed in the spring-like region and thereby significantly reduces or eliminates stresses transmitted to the central region of the window.

BRIEF DESCRIPTION OF THE DRAWINGS

FIG. 1 is a front FIG. 1a and edge FIG. 1b view of the stress-free window.

FIG. 2 is a schematic view of the windows of FIG. 1 mounted on a laser tube.

FIG. 3 is a side FIG. 3a and top FIG. 3b view of a typical Ne-He laser structure with the stress-free windows in place.

DESCRIPTION

The present invention is directed to an improved optical window or lens of the type useable in a laser. In the specific embodiment shown and described herein, the improved window is a stress-free Brewster window. Referring now to FIGS. 1, a and b, there is shown a transparent glass window 10 in the form of a flat disc. The flat disc window may instead be a lens if desired. The window 10 has a stress-free central area 11, a plurality of stress relief grooves 12, 13 and 14 and a surrounding mounting area 15 at the periphery of the window. The number of grooves is not intended to be limited to three as shown. The grooves which may be prepared by etching or machining are shown as being circular in FIG. 1a for the preferred embodiment but may be non-circular if desired.

In one specific embodiment of the invention the diameter of the window 10 is about 15 mm, the central area 11 is about 4.3 mm in diameter, the thickness of the window is about 1.2 mm and the depth of the grooves 12, 13 and 14 is about 0.6 mm. The depth of the grooves may also be substantially deeper than about one half of the thickness of the window as is set out in the specific embodiment. Each succeeding groove has a different radius. The plurality of concentric grooves preferably alternate from one surface of the window to the other as is shown in FIG. 1.

In FIG. 2 there is shown diagrammatically a laser tube 20 with the stress-free Brewster window 10 at each end. The dashed line passing through the stress-free center of the windows shows the path of the emanating laser beam. In FIG. 3, a and b, there is shown in more detail a conventional NeHe laser which utilizes the improved stress-free windows 10 of the invention. The mounting or bonding surface area of the window 10 and the mating surface of the glassy laser structure 21 where the surfaces contact, are made very smooth so that the molecules bond together to provide a vacuum tight seal for the laser chamber, which chamber contains a low pressure fill or mix of helium and neon at about 5 Torr. Epoxy bonding or the like may also be used. In FIG. 3b the window are removed so the laser beam passage is more clearly seen.

The stress-free Brewster windows 10 described above and the laser body to which the windows are sealed may have small mismatches in expansion coefficients which results in stresses in the glass as the temperature changes. The series of grooves 12, 13 and 14 in the present window effectively form a resilient or spring-like zone between the outer perimeter mounting area and the central area used for the light beam transmission to isolate stresses at the mounting area from reaching and affecting the window central region. The differential (thermal) motion is absorbed or decoupled in the spring-like region and significantly reduces stresses reaching the central region 11.

The embodiments of the invention in which an exclusive property or right is claimed are defined as follows:

1. A stress-free optical element for laser applications comprising:
   a unitary disc-like transparent optical element having both a relatively stress-free central area for transmission of a light beam as well as a surrounding mounting area near the periphery;
   a plurality of concentric grooves formed in the element surface on one side of the element; and,
   at least one further concentric groove formed in the element surface on the opposite side of the element and of radius different from the intermediate said plurality of concentric grooves, said grooves forming a spring-like portion in said unitary optical element to effectually mechanically decouple said stress-free central area from said surrounding area.

2. The optical element according to claim 1 wherein the depth of the grooves is at least one half the thickness of the disc like optical element.

* * * * *

UNITED STATES PATENT AND TRADEMARK OFFICE
CERTIFICATE OF CORRECTION

PATENT NO. : 4,421,386
DATED : December 20, 1983
INVENTOR(S) : THEODORE J. PODGORSKI It is certified that error appears in the above-identified patent and that said Letters Patent is hereby corrected as shown below:

Claim 1, line 11, before "intermediate" cancel "the"

and substitute --and--.

Signed and Sealed this

Thirteenth Day of March 1984

[SEAL]

Attest:

GERALD J. MOSSINGHOFF

Attesting Officer     Commissioner of Patents and Trademarks